(12) United States Patent
Wong et al.

(10) Patent No.: US 6,754,216 B1
(45) Date of Patent: Jun. 22, 2004

(54) METHOD AND APPARATUS FOR DETECTING CONGESTION AND CONTROLLING THE TRANSMISSION OF CELLS ACROSS A DATA PACKET SWITCH

(75) Inventors: Michael Wong, Fremont, CA (US); Rajesh Nair, San Jose, CA (US); Milan Momirov, San Francisco, CA (US)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 09/566,602

(22) Filed: May 8, 2000

(51) Int. Cl.[7] .............................................. H04L 12/28
(52) U.S. Cl. ................................ 370/395.42; 370/395.7
(58) Field of Search .......................... 370/395.1, 395.7, 370/395.6, 408, 418, 466, 446, 236, 230.1, 395.4–395.43

(56) References Cited

U.S. PATENT DOCUMENTS

| | | | | |
|---|---|---|---|---|
| 5,179,556 A | * | 1/1993 | Turner ......................... | 370/233 |
| 5,313,454 A | * | 5/1994 | Bustini et al. ............... | 370/231 |
| 5,724,358 A | * | 3/1998 | Headrick et al. ............ | 370/418 |
| 5,953,318 A | * | 9/1999 | Nattkemper et al. ........ | 370/236 |
| 6,061,330 A | * | 5/2000 | Johansson .................... | 370/229 |
| 6,154,446 A | * | 11/2000 | Kadambi et al. ........... | 370/239 |
| 6,243,382 B1 | * | 6/2001 | O'Neill et al. .......... | 370/395.52 |
| 6,477,169 B1 | * | 11/2002 | Angle et al. ........... | 370/395.42 |

* cited by examiner

*Primary Examiner*—Chi Pham
*Assistant Examiner*—Keith M. George
(74) *Attorney, Agent, or Firm*—James A. Harrison; Bruce E. Garlick

(57) ABSTRACT

A system enables a cell of data to be transmitted one time over a high speed data bus to an Ethernet switch system where it is then distributed to each of the destinations for which it is intended. A first group of buffers is for temporarily storing data that is to be delivered to only one destination. A second group of buffers is for holding the cells that are to be transmitted to a plurality of devices. In the described embodiment of the invention, the unicast and multicast cells are transmitted over the same line or bus. The invention further includes a switch processor that is formed to detect congestion within the switch fabric and to transmit a congestion rating to each device coupled to transmit and receive data through the switch fabric.

20 Claims, 12 Drawing Sheets

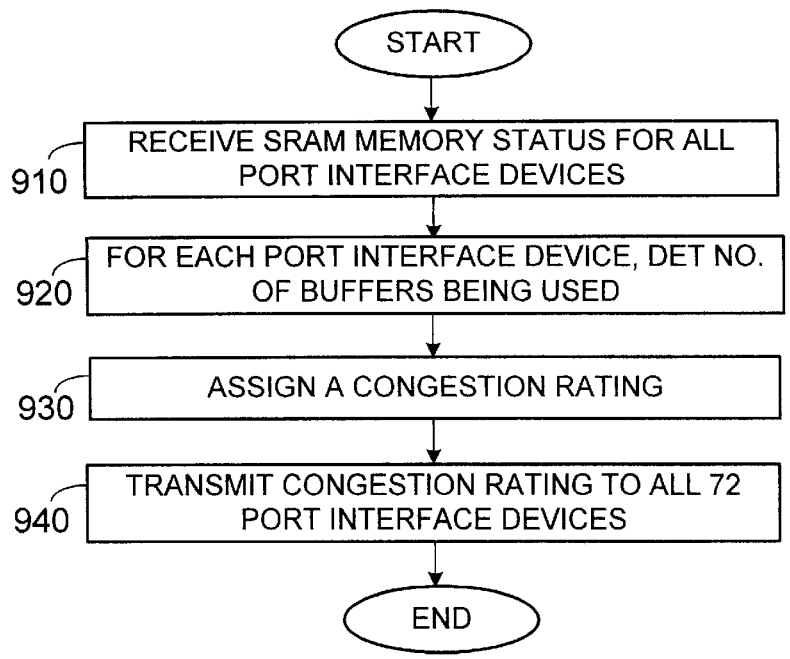

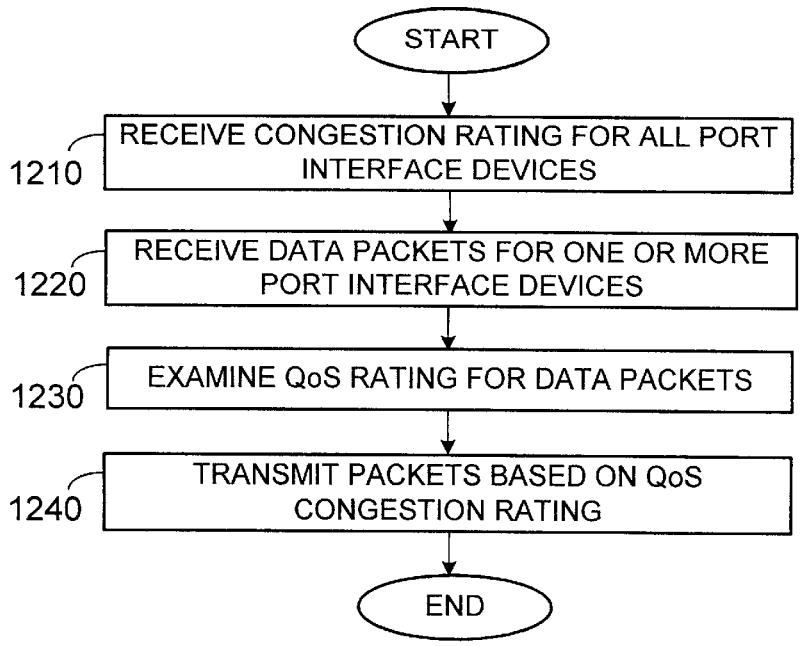

METHOD AND APPARATUS FOR DETECTING CONGESTION AND CONTROLLING THE TRANSMISSION OF CELLS ACROSS A DATA PACKET SWITCH

CROSS REFERENCE TO RELATED APPLICATIONS

This application is related to and incorporates by reference the following applications in their entirety by the same inventors, the following applications being filed concurrently herewith and having the following titles and serial numbers: "METHOD AND APPARATUS FOR TRANSMITTING DATA THROUGH A SWITCH FABRIC ACCORDING TO DETECTED CONGESTION", Ser. No. 09/566,604; "METHOD AND APPARATUS FOR TRANSMITTING CELLS ACROSS A SWITCH IN UNICAST AND MULTICAST MODES", Ser. No. 09/566,603;

This application also is related to, claims priority to, and incorporates by reference the following application in its entirety, said following application having at least one inventor in common with the invention described herein the present application, said application having the following title, filing date and serial number: EFFICIENT PATH BASED FORWARDING AND MULTICAST FORWARDING, filed on Jun. 29, 1998, having a Ser. No. of 09/106,797.

BACKGROUND

1. Field of the Invention

The present invention relates to the field of computer networking, specifically to the field of data communications in a private or public packet networks. More specifically, the present invention relates to a method and apparatus for transmitting cells through switch from a source to a destination.

2. Description of Related Art

Asynchronous Transfer Mode and other packet networks are characterized by high-speed switches that act to switch data cells of a fixed size and format through the network. Typically, ATM networks communicate using data cells that are relatively short fixed length packets of data that carry voice, video, and computer data across networks at high-speeds relative to the speeds of traditional data networks such as Ethernet, Token Ring, and Fiber Distributed Data Interface (FDDI) Networks. A typical ATM cell is 53 bytes long wherein 5 bytes are for header information and 48 bytes are for data. Often times, however, variations of the same are provided wherein the cell length is modified for different reasons. For example, in one fixed length packet network, a 4-byte header is used and 76 bytes of data are used. This particular cell size is advantageous in that it Traditional local area networks (LANs) operate over shared media. All network devices on a particular network segment must share media with each other so that each device is provided with only a fraction of the total bandwidth of the media. Newer generation intelligent hubs support multiple segments of different types of LANs across their back planes to permit LANs to be segmented so that each network device is provided with greater bandwidth. Such hubs provide for a dedicated LAN interface so that, for example, in the case of an Ethernet LAN, a single network device is provided with the full 10 Mb/s bandwidth of the LAN segment. Each port on the hub is connected internally within the hub; typically, by either a high-speed bus or a cross connect.

Such hubs may be known as switching hubs. Generally a switching hub acts to concentrate wiring for a communications network in a central location such as a facilities telephone-wiring closet. The hub comprises a cabinet having multiple ports wherein each port supports one LAN segment. Each area local area network may support multiple network devices such as an end user system that may communicate over the local area network.

Such hub architectures are limited in that they can not scale to the high bandwidths required for integrated networks that transmit real time voice, video, and data. Fixed length packet networks, however, are capable of providing the bandwidth and throughput required for such applications. Such networks are capable of transmitting integrated voice, video, and data traffic because, as described above, they use small fixed size cells. By transmitting small fixed sized cells, these networks overcome delays associated with transmitting relatively large, variable length packets as experienced in traditional data networks. Accordingly, fixed packet length networks greatly increase transmission efficiencies.

Standards have been adopted for ATM networks, for example, by the international telegraph and telephone consultive committee (CCITT). The ATM forum, a group of telecommunications and data networking companies formed to insure the interoperability of public and private ATM implementations facilitates, clarifies, and adopts ATM standards.

The ATM standards are defined with respect to a user-to-network interface (UNI) and a network-to-network interface (NNI). Thus, UNI refers to an interface between a network device such an end user system and an ATM switch. ATM switches transmit information in fixed sized cells, which are formed of well defined, and size limited header areas and user information areas as described before. ATM switches utilize a variety of switching architectures, including, for example, matrix switching architectures back plane bus architectures, and other architectures. The two primary tasks that are generally accomplished by an ATM switch include the translation of path information and the transport of ATM cells of an input port to an output port.

A switch is typically constructed of a plurality of switching elements that act together to transport a cell from the input switch to the correct output. Various types of switching elements are well known such as the matrix switching element and the back plane bus switching elements mentioned before. Each is well known to those of the ordinary skill in the art and each carry out the two above-mentioned tasks.

In a traditional fixed length packet switch, a data packet is received from an external network, e.g. an Ethernet switch, where it is temporarily stored in a buffer. After a plurality of packets have been received, the packets are formed into a cell and then transmitted from an input stage to an intermediate stage where a plurality of cells are combined to create a stream of cells that are transmitted to the switching fabric itself. The switching fabric then receives the stream of cells, stores it in a temporary buffer, for example, an SRAM buffer and then transmits it back out from the switching fabric to the intermediate stage where the stream of cells is broken back into individual cells. The individual cells are transmitted to the output end where they are converted back to packets and then transmitted to the appropriate output location. In a conventional system, a cell that is to be transmitted in a multicast format is transmitted once for each destination to which it is to be transmitted.

Accordingly, system efficiencies are lost because system resources are used to continuously transmit the same cell of data. Additionally, even with the above described inefficiencies, the throughput capacities of the receive devices or systems on a high speed bus cannot process receive data at the rate at which the data is being transmitted to the device. Accordingly, the receive buffers are not emptied fast enough. Thus, when the receive buffers are not emptied at a fast enough rate, a type of blocking known as head of line blocking occurs.

Another problem that is encountered during switch fabric operations is that of congestion within the switch fabric. Traditionally, when congestion occurs, and there is no room for additional data, groups of cells are discarded and are not transmitted to their destination. For example, if a group of cells includes data that causes congestion for only one destination, the whole group of cells may still be discarded. What is needed, therefore, is a system and apparatus that intelligently controls data transmissions in light of detected congestion conditions to minimize the occurrence and quantity of data that is discarded due to congestion.

SUMMARY OF THE INVENTION

The present apparatus and method of use comprises a system that solves the aforementioned problems by efficiently transmitting data that is to be delivered to a plurality of destinations in a manner that also reduces head of line blocking and that reduces congestion or the negative effects of congestion including the discarding of data. According to an exemplary embodiment of the invention, a multicast cell is stored in a separate buffer that is only for buffering multicast cells. As multicast cells typically comprise about twenty percent of high speed data bus traffic, separating the multicast cells increases the amount of unicast data that can be transmitted to a particular device by twenty five percent thereby significantly reducing head of line blocking. In general, the method includes buffering the multicast messages that are to be delivered to a plurality of destinations in separate memory buffers at both the transmit and receive ends of the high speed data bus. A multiplex device receives a cell and determines that it is a multicast cell and stores it in the corresponding buffer for multicast cells. The multiplex device determines the cell is a multicast cell by examining the logical value of a bit within the header of the cell that defines whether the included cell is a multicast cell or a unicast cell.

If the cell is a multicast cell, the invention not only includes storing the cell in a specified buffer for multicast cells, but also includes examining the contents of an address field within the cell header. The address within the cell header is used as an index to a table stored in memory wherein the index specifies a unique combination of destination devices that are to receive the cell and then the addresses. Thus, the invention includes a method and apparatus for storing unique combinations of destination addresses in relation to address indexes stored within the header portion of the multicast cells.

More specifically, the fabric access devices are formed to have three groups of buffers. The first group of buffers is a set of buffers for receiving data over a high speed data bus. A second set of buffers is for temporarily holding the so called unicast cells that are to be transmitted to only one device. The third and final set of buffers are for holding the so called multicast cells that are to be transmitted to a plurality of devices.

Similarly, a multiplex device that transmits and receives cells to and from the fabric access devices includes three sets of buffers as well. A first set of buffers is for holding cells that are to be transmitted to the receive buffers of the fabric access device while the second and third set of cells are for receiving the unicast and multicast cells from the fabric access device. In the described embodiment of the invention, the unicast and multicast cells are transmitted over the same line or bus. Accordingly, the multiplex device includes a parsing unit that examines a field within the header portion of each of the received cells to determine whether the received cells are unicast or multicast cells. If a cell is a unicast cell, it is temporarily stored within the unicast receive buffer set. If the cell is a multicast cell, then it is temporarily stored in the multicast buffer set.

In addition to comprising a unique buffer structure in both the fabric access devices and the multiplex devices, the invention includes having a memory whose contents include a table that is used for addressing purposes for the multicast cells. This determines the unique set of destination devices and their respective addresses that are to receive the multicast cell. Accordingly, the multiplex device determines the addresses for the destination devices and distributes the multicast cell accordingly. Thus, the invention not only includes a novel buffer configuration, but also includes transmitting multicast cells with an index value of a mapped table that, in conjunction with the novel buffer configuration, enables a system to transmit a multicast message only once over a high speed data bus thereby improving system efficiencies and increasing system throughput capacity. The inventive system also includes transmitting data packets or cells through the switch fabric of the above-described system in a method that accounts for congestion. More specifically, a switch controller continuously monitors the memory that is used to temporarily hold data that is being transmitted through the switch fabric to determine the amount of memory being consumed by each of the potential destination devices that are coupled to transmit and receive data through the switch fabric. More specifically, in the described embodiments of the invention, each device that is coupled to transmit and receive data through the switch fabric is allocated a specified amount of memory for temporarily holding data packets or cells that are being transmitted through the switch fabric. Accordingly, congestion occurs when the amount of memory allocated to a device can not hold data being received therefor. Thus the invention includes a method and apparatus to minimize the occurrence of such congestion.

Accordingly, the switch processor continuously receives memory status for each of the memory areas that are allocated to each device that is coupled to transmit and receive data through the switch fabric. Thus, the switch processor examines the received status and assigns a congestion rating for each allocated memory area. The assigned congestion rating is then transmitted to each external device that is coupled to transmit and receive data packets or cells through the switch fabric. In the described embodiments of the invention, one of four different congestion ratings is assigned by the switch processor to each memory area that corresponds to each of the external devices that are coupled to transmit and receive data packets or cells through the switch fabric.

BRIEF DESCRIPTION OF THE DRAWINGS

FIG. 9 is a flow chart illustrating a method within a controller for monitoring congestion according to one embodiment of the described invention.

FIG. 10 is a table that illustrates an exemplary assignment of congestion rating with respect to the amount of memory consumed.

FIG. 11 is a table that illustrates the contents of memory in which there exists a mapping between the 72 PIDS of the system and their respective congestion ratings.

FIG. 12 is a flow chart illustrating a method, performed by a port interface device, for determining whether to transmit a data packet to another port interface device through a switch fabric.

FIG. 13 is a table illustrating an example of a method for transmitting packets based on congestion rating according to one example of the described invention.

FIG. 14 is a table illustrating the assignment of quality of service ratings according to the type of data being transmitted which, may also relate to the source of the data.

DETAILED DESCRIPTION OF THE DRAWINGS

Figure 1:
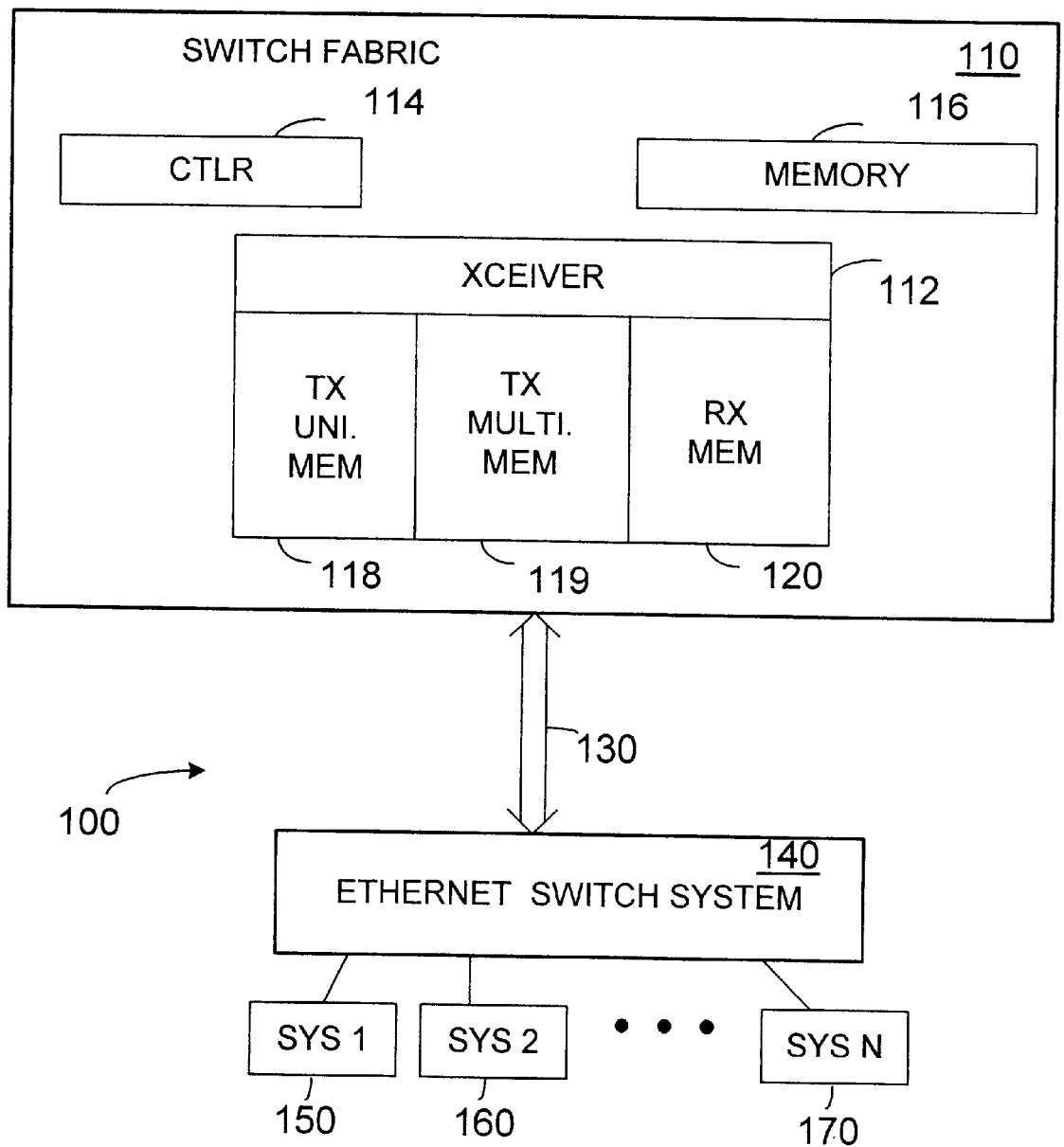
FIG. 1 is a functional block diagram of switch fabric according to one embodiment of the present invention.

FIG. 1 is a functional block diagram of switch fabric according to one embodiment of the present invention. Referring now to FIG. 1, switch fabric 110 is coupled to communicate over a high-speed bus 130 with an Ethernet switch system 140. The Ethernet switch system is able to communicate with a plurality of external systems 1 through N listed in FIG. 1 as systems 150, 160, and 170. It is understood, however, that a significant number of external systems may communicate with the Ethernet switch system 140.

Switch fabric 110 includes a transceiver 112 that transmits and receives communication signals over high-speed data bus 130. Additionally, switch fabric 110 includes a controller 114 for controlling operations of the switch fabric 110 and a memory 116 for temporally storing or buffering data that is received over the high-speed data bus that is to be output back onto the high-speed data bus to a different destination. For example, Ethernet switch system 140 may receive a stream of data from system 150 that is to be transmitted to system 170.

In the present inventive system, the multicast signal (including packets and/or cells) is transmitted but one time over the high speed bus connecting the switch fabric to an external switch system (e.g. an Ethernet switch). In the prior art, a data packet or cell that is to be transmitted to a plurality of destinations is transmitted once over a high speed data bus for each destination to which it is to be ultimately delivered. Accordingly, for example, if a cell is to be delivered to 72 different devices, then that cell, in the prior art, is transmitted over the high speed data bus a total of 72 times. Upon receipt by a multiplex device, the data packet is sorted and routed to the individual destinations according to an internal address stored within the cell header.

Transceiver 112 includes a unicast transmit memory buffer 118 a multicast transmit buffer 119 and a receive memory buffer 120. Transmit and receive memory buffers 118, 119, and 120 are for temporarily holding data that is to be transmitted over the high-speed data bus 130 or data that has just been received from the high-speed data bus 130. Whenever transceiver 112 receives data from high-speed data bus 130, it initially stores it in the receive memory buffer 120 prior to transmitting it to memory 116 for storage. Similarly, when data is to transmit out on to the high-speed data bus 130, transceiver 112 obtains the data from memory 116 and temporarily stores it in the transmit memory buffer 118 or 119 for transmission over the high-speed data bus 130 according to whether it's a unicast (single destination), or multicast transmission (multiple destinations).

As may be seen, therefore, memory 116 is for holding data that is received from a first location over the high-speed data bus 130 that is to be transmitted to a second location over the same high-speed data bus. It is the Ethernet switch system 140 that actually is coupled to the different locations or systems, for example, systems 150, 160, and 170, and that receives data from the various systems and transmits it to others of the various systems.

For example of a unicast transmission, system 1 may have data that is to be transmitted only to system 170. To deliver the data to system 170, system 150 transmits the data to Ethernet switch system 140, which in turn transmits it to the switch fabric 110 over the high-speed data bus 130. The switch fabric 110, and more specifically, the transceiver 112, upon receiving the data, temporarily stores it in RX memory buffer 120. Thereafter, the data is stored temporarily, although for a longer period of time within memory 116. In the described embodiment of the invention, memory 116 is formed of SRAM memory. Then, according to control signals transmitted by controller 114, the data is transmitted from memory 116 and is placed in the transmit memory buffer 118. Upon receiving the appropriate control command from controller 114, transceiver 112 transmits the data stored within transmit memory buffer 118 over the high-speed data bus 130. The Ethernet switch system, 140, upon receiving the data from high-speed data bus 130, examines the destination address of the data, and transmits it to the appropriate system. Here, the destination indicated in the header address is system 170.

The above described process is commonly referred to as a unicast transmission mode wherein a group of data packets received from one system are converted to a cell and then transmitted to only one other system.

An alternate mode of operation is commonly known as a multicast operation. In a multicast mode of operation, the switch fabric, upon receiving the data that is to be transmitted to a plurality of systems, transmits the data once to each of the systems to which it is to be delivered. In the described embodiment of the present invention, however, multicast operations are performed differently. More specifically, switch fabric 110 transmits the multicast message over high-speed data bus 130 only one time to Ethernet switch system 140. Ethernet switch system 140, when formed according to the present invention, then receives the multicast message and transmits it to each of the external destinations to which it is to be delivered. Accordingly, in the present invention, duplicative transmissions that are wasteful of system resources are avoided.

It should be understood that the example of FIG. 1 includes memory based switch fabric for exemplary purposes. Other switching fabrics may also be used according to the teachings of the present invention. For example, any type of known digital packet switch may be used in the manner described herein to include network transmission efficiencies.

Figure 2:
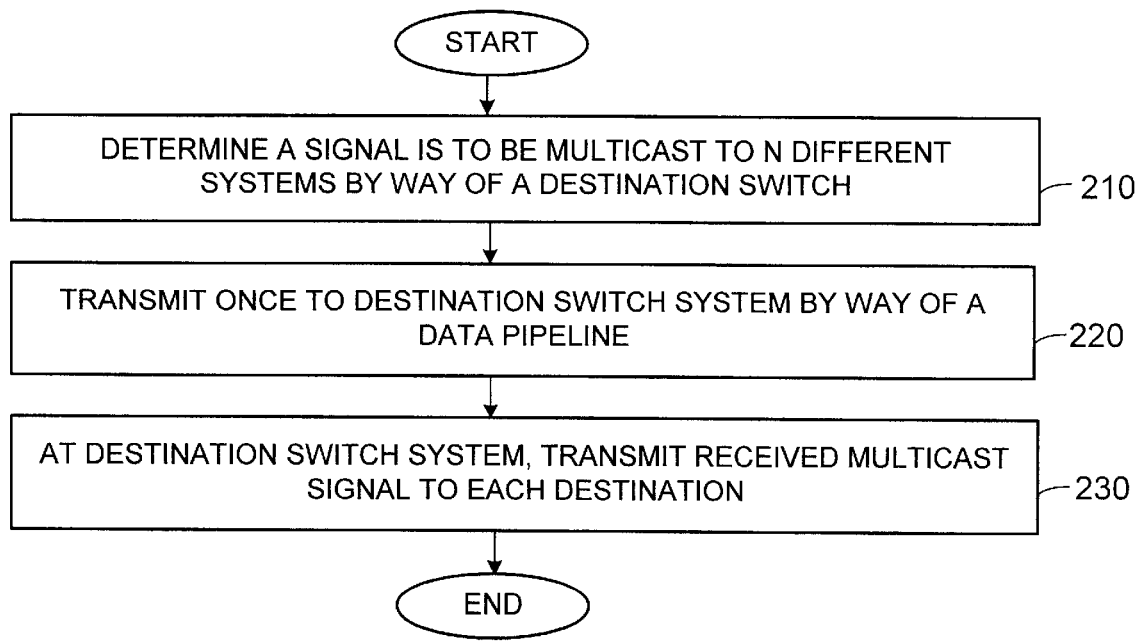
FIG. 2 is a flow chart illustrating a method for transmitting multicast messages to a plurality of different systems according to the present invention.

FIG. 2 is a flow chart illustrating a method for transmitting multicast messages to a plurality of different systems according to the present invention. Referring now to FIG. 2, a packet switch, by way of example, switch fabric 110 of FIG. 1, determines that a signal is to be transmitted in a multicast mode to a plurality of different systems by way of a destination switch (step 210). The destination switch, in the described embodiment, is an Ethernet switch. In general, however, any switch that can receive packets of data, analyze a destination address, and route the packet thereto may be used herein.

In the described embodiment, the switch fabric may determine that a signal is to be transmitted in a multicast mode to a plurality of different systems by examining the contents of the signal. In the described embodiment of the invention, signal headers include a bit that defines whether the signal is a unicast signal that is to be transmitted to only one destination device or a multicast signal that is to be transmitted to a plurality of destination devices. Accordingly, in the method of FIG. 2, the switch analyzes the contents of a packet header to determine that it is a multicast signal.

Once the switch determines that a given packet is a multicast signal, it transmits the signal once to the destination switch system by way of a data pipeline (step 220). As may be seen, the signal or packet is transmitted only once through the data pipeline even though it is a multicast signal, meaning that it is to be delivered to a plurality of different systems. Thereafter, at the destination switch system, the received multicast signal is transmitted to each of the systems to which it is to be delivered (step 230).

In the described embodiment of the invention, the destination switch system includes a controller and a memory. The controller determines which destination systems are to receive a multicast signal by using mapped information within the memory that is stored in relation to a vector or address within a header of the multicast signal. Accordingly, the switching portion of the destination switch system receives the destination addresses from the memory and transmits the multicast signal accordingly.

Figure 3:
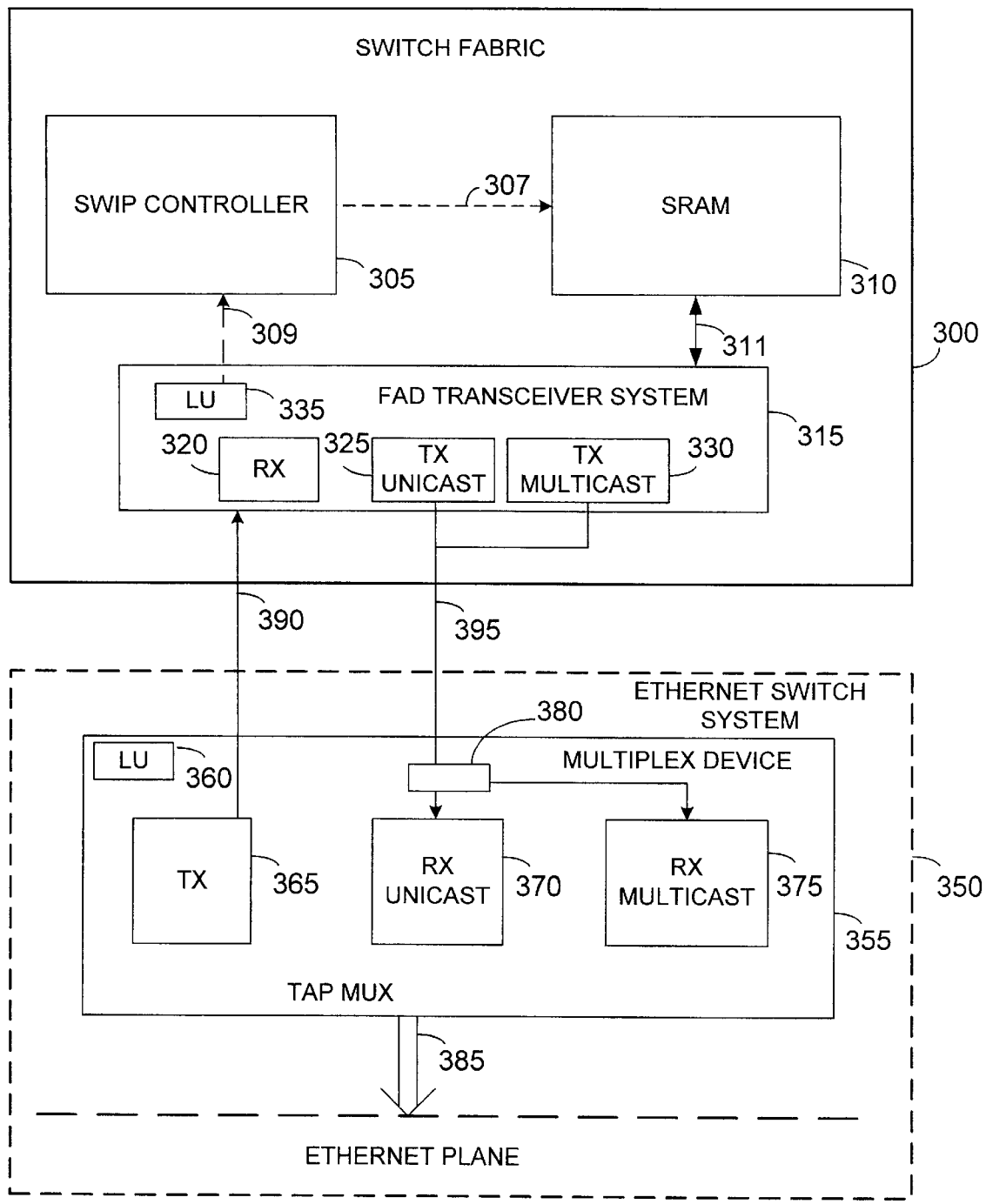
FIG. 3 is a functional block diagram of switch fabric in communication with an Ethernet switch system according to one embodiment of the described invention.

FIG. 3 is a functional block diagram of switch fabric in communication with an Ethernet switch system according to one embodiment of the described invention. Referring now to FIG. 3, switch fabric 300 includes a switch processor (SWIP) ASIC, labeled herein as SWIP controller 305, SRAM memory, labeled herein as memory 310, and a fabric access device, labeled herein as FAD transceiver system 315, for receiving and transmitting streams of cells over a high-speed data bus.

As will be explained in greater detail below, a FAD transceiver system includes a plurality of receive and transmit buffers, wherein there exists a set of buffers for every Tap Mux (multiplex device) 355 with which the FAD is to communicate. For the described example of FIG. 3, however, only one set of transmit and receive buffers are shown in communication with only one Tap Mux 355 for simplicity. FAD transceiver system 315, therefore, includes a receive buffer 320, a unicast transmit buffer 325, and a multicast transmit buffer 330. Additionally, a logic unit 335 includes all of the operational logic for the FAD transceiver system 315. In the described embodiment of the invention, the FAD transceiver system 315 is formed as an application specific integrated circuit (ASIC).

An Ethernet switch system 350 includes a plurality of Tap Muxes 355 that receive and transmit data packets from the FAD transceiver system 315 that are coupled to a plurality of Ethernet switches that route data packets to external devices connected thereto. Each Tap Mux 355 includes a logic unit 360 for controlling the operations of the Tap Mux 355, a transmit buffer 365, a unicast receive buffer 370, and a multicast receive buffer 375. Additionally, Tap Mux 355 includes a parsing unit 380 which separates the received signals and distributes them to the unicast buffer 370 or the multicast buffer 375 according to whether the signal is a unicast signal or a multicast signal. The Tap Mux 355 then communicates with an actual Ethernet switch in an Ethernet plane over a bus 385 to transmit signals to specific external systems through the Ethernet switch.

As may be seen, Tap Mux 355 also communicates with switch fabric 300 over lines 390 and 395. As is indicated, line 390 conducts signals from the Tap Mux transmit buffer 365 of the Tap Mux 355 to the FAD transceiver system receive buffer 320 while line 395 conducts communication signals from either the unicast transmit buffer 325 or the multicast transmit buffer 330 of FAD transceiver system 315 to parsing unit 380 of Tap Mux 355. It is understood that lines 390 and 395 are part of a high-speed data bus and are shown here as separate lines to facilitate description of the system operation.

Continuing to refer to FIG. 3, SWIP controller 305 is, in the described embodiment, an ASIC processor and is not in the data path of the switch fabric 300. Rather, SWIP controller 305 communicates with memory 310 to obtain memory status information and more specifically, memory content information over a line 307. It also communicates with a logic unit 335 of FAD transceiver system 315 over a line 309. SWIP controller 305 produces control signals to logic unit 335 for controlling the transmission and reception of data packets and for their storing and retrieval from memory 310 over bus 311. In the described embodiment, the data packets are transmitted in the form of a stream of cells. Thus, its function is to manage the logical output queues in the switch fabric memory and to generate the address and control signals for the switch fabric SRAM. The switch fabric, and more particularly, the FAD transceiver switches, are formed to process cells that, in the described embodiment, are 80-byte cells. These 80-byte cells include seventy-six bytes that are for transmitting data (payload) and four bytes that are for transmitting cell headers. The cell header contains a twelve bit addressing portion that includes an 11-bit cell destination address and other routing instructions used by SWIP controller 305. Wherein one bit indicates whether the cell is a multicast cell or whether the address is a physical address. A physical destination address typically is 11 bits long and comprises 5 bits for defining the Tap Mux multiplex device (Tap Mux) to which the packet is to be transmitted, 3 bits for defining the external device or system to which it is to be transmitted by the Tap Mux, and 3 bits for the specific port on the specific external device through which the data is to be transmitted. If the one bit of the 12 bits indicates that the cell is a multicast cell, then the 11 bit multicast address portion of the header is used to carry an index value of a table that specifies or maps what systems or devices are to receive the data cell in relation to the index value.

In operation, Tap Mux 355 loads a plurality of cells to be transmitted to the switch fabric in its transmit buffer 365. Upon receiving a ready signal from switch fabric 300, the Tap Mux 355 transmits all of the contents within the transmit buffer 365 to the receive buffer 320 of FAD transceiver system 315. Thereafter, FAD transceiver system 315 uploads the received cells into memory 310. The specific location within memory 310 into which the cells are loaded is a function of the device address within the cell header because the data is stored in a portion of memory reserved for the destination device.

Upon receiving control command from SWIP controller 305, the FAD transceiver system 315 receives cells from memory 310 for transmission back to the Ethernet switch system 315. The receive cells are stored temporarily either in the unicast transmit buffer 325 or the multicast transmit buffer 330. Thereafter, when the SWIP controller 305 generates the appropriate control signals, as received by logic unit 335 over line 309, one of the unicast or multicast transmit buffers will place its contents on line 395 and transmit the cells therein to Tap Mux 355.

The cells that are received over line 395 by Tap Mux 355 are parsed by a parser 380 and are separated according to whether the cell is a unicast cell or a multicast cell. As indicated before, in the described embodiment, a bit within the received cell header defines whether the cell is a unicast or a multicast cell. Accordingly, the parsing unit 380 stores the cell in the corresponding unicast receive buffer 370 or multicast receive buffer 375. Thereafter, the Tap Mux 355 transmits the contents of the receive unicast buffer 370 or the receive multicast buffer 375 to the actual packet switch of the Ethernet plane over a bus 385. In the described embodiment, the packet switch is an Ethernet switch. Accordingly, FIG. 3 illustrates that the packets are transmitted from buffer 370 or buffer 375 to an Ethernet plane.

Figure 4:
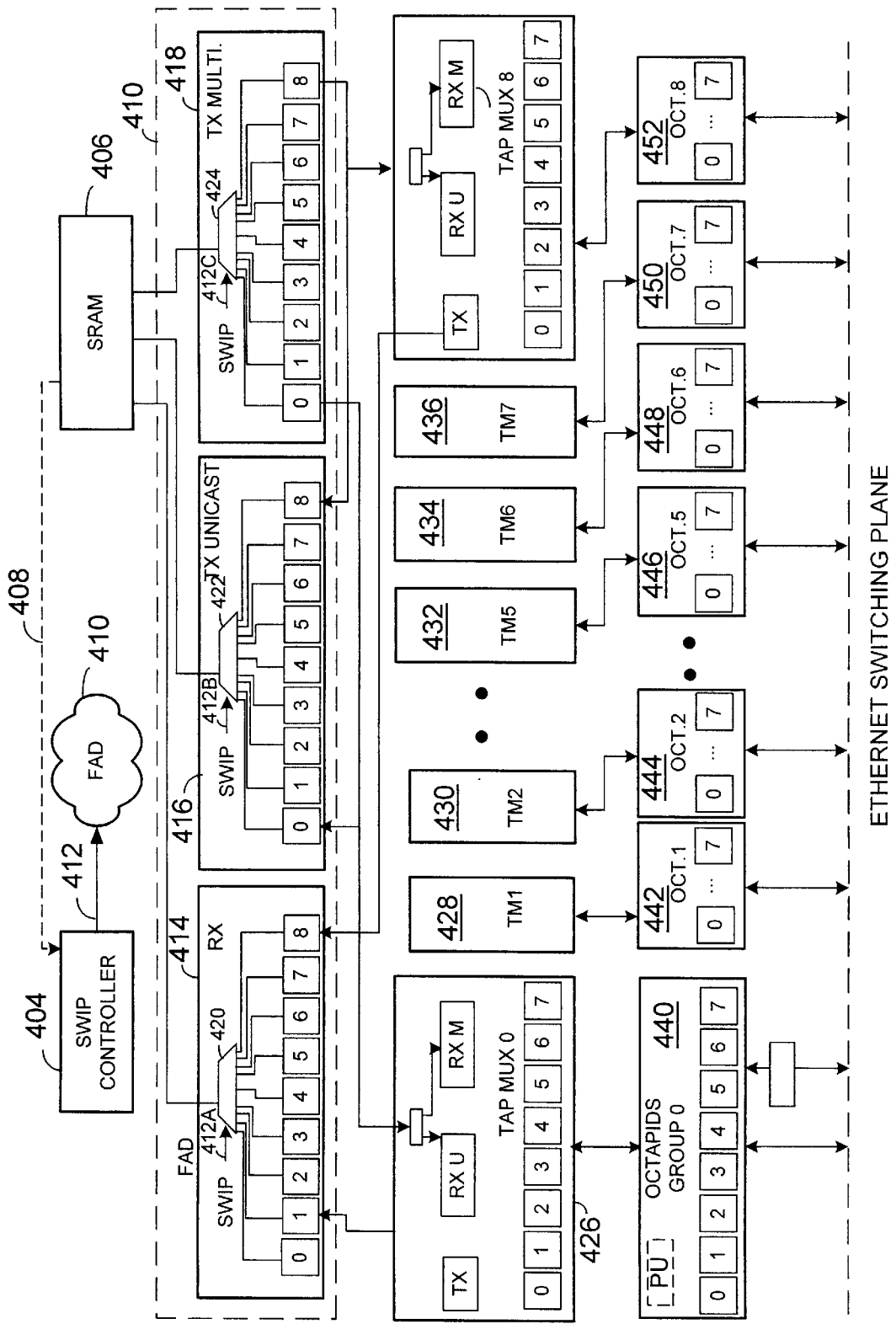
FIG. 4 is a functional block diagram of switch fabric in communication with a plurality of external devices for receiving and transmitting data according to one embodiment of the present invention.

FIG. 4 is a functional block diagram of switch fabric in communication with a plurality of external devices for receiving and transmitting data according to one embodiment of the present invention. Referring now to FIG. 4, a SWIP controller 404 is coupled to receive content information from an SRAM memory 406 over a line 408 and to transmit control commands to a FAD 410 over a plurality of lines 412. For simplicity, not all the components of the FAD 410 are shown. For example, a logic unit that controls the operations of the FAD is not shown.

FAD 410 includes three groups of buffers. The first group of buffers are the receive buffers 414. The second set of buffers are the unicast transmit buffers 416. The third set of buffers are the multicast transmit buffers 418. Each of the groups of buffers 414, 416, and 418 further include multiplexer 420, 422, and 424 respectively that are used to select the specific buffer that is to transmit data to SRAM memory 406 or that is to receive data from SRAM memory 406. As may be seen, each group of buffers include nine buffers labeled 0–8.

SWIP controller 404 generates the control signals to each of the multiplexers 420, 422, and 424 of the buffer groups 414, 416, and 418 to selects a specific buffer that is to receive or transmit data to and from SRAM memory 406. Thus, line 412 that is shown between SWIP controller 404 and FAD 410 is illustrated as lines 412A, 412B, and 412C for the buffer groups 414, 416, and 418. In the described embodiment, each of the buffer groups 414, 416, and 418 actually include a total of nine buffers for receiving or transmitting data. Each of the nine buffers are coupled to nine different Tap Muxes (multiplex devices).

In the described embodiment of the invention, a Tap Mux is a 655 pin (E-PBGA) ASIC that resides on port cards and interfaces to fit switch fabric cards across a back plane. The Tap Mux chip on each port module has separate interfaces to the two switch fabrics. On the back plane side of this chip there are eight channels in each direction to and from each of the two switch fabrics. Each of these eight channels is a high-speed differential pair of multicast clock and data serial links. For receiving traffic on a port side, each Tap Mux has eight 16-byte unidirectional buses that are each connected to a port interface device chip. Thus far in the application, these port interface device chips have been referred to as external devices.

In the systems of the Assignee of the present invention, the port interface device chips are known as OctaPIDs. During normal operation, when both switch fabrics are active, the Tap Mux sends cells from the four port interface devices on one side of the card to one fabric and cells from the other four port interface devices to the other of the two fabrics. If only one of the fabrics are active, the Tap Mux sends cells from all eight port interface devices to the active switch fabric. The Tap Mux gets the information about the fabrics by way of a back plane signal, in the described embodiment, from each fabric and from an internal configuration register.

On the port device interface side, each Tap Mux has 16 unidirectional buses supporting up to eight port interface device ASICs. The PID or port interface device buses are grouped into two banks within the Tap Mux. Bank zero is the grouping of port interface device buses zero through three and bank one is the grouping of port interface device buses four through seven.

During normal operation, when both fabrics are active, the Tap Mux cells received from bank zero are forwarded to fabric zero and the cells from bank one are forwarded to fabric one. If only one of the fabrics is active, then the Tap Mux redirects traffic from both banks to the active fabric. The Tap Mux gets the information about the active fabric either by a configuration register setting or in real time from status signals on the back plane (fabric access device side). The normal cell size in the described embodiment is twenty 32 byte words on the fabric side. However, on the port interface device interface, the cell size can be twenty or sixteen 32-byte words for non-end of packet cells (EOP). A byte in the cell header (64 byte cell mode) specifies whether the interface carries sixteen or twenty 32-byte word non EOP cells. For EOP cells, the cell size may be anywhere from four to twenty 32-byte words. This is because the Tap Mux of the present invention supports early termination of EOP cells on the port interface device side of the interface.

Internal to the Tap Mux, are eight independent 3 cell buffers, one for each of the eight port interface devices of an OctaPID. Each cell is read from the buffers 128 bytes at a time, multiplexed over eight high-speed data bus channels and driven over the back plane (FAD) in the described embodiment provided that a control signal is received from the SWIP controller indicating that the fabric access device has available space in its buffers and memory.

The port interface device is a master of the port interfaces on that side of the Tap Mux. Each interface is a sixteen bit dedicated bus serving the port interface device. The Tap Mux interfaces to the fabric access devices through the high-speed bus interface. A nibble of data is serialized onto a single high-speed data bus channel. Hence the thirty-two byte word used for cell data transfer uses eight high-speed data bus channels in either direction. A nibble, as is known to those skilled in the art, is a 4-bit word that is either the first or second half of a byte of data.

A continuous byte pattern "88" (HEX) is transmitted when the interfaces idle in the described embodiment of the invention. A start of a cell pattern "0xAA" is transmitted before every cell. The idle pattern helps in clock recovery and insures transitions of the high-speed data bus channel even when the Tap Mux is idle. It also facilitates nibble alignment on the deserialized data from the high-speed data bus channels at the destination end. On receiving a valid cell, the cell data stored in eight sets of first in first out buffers, one for each FAD. The nibbles from each FAD are written into the first in first out buffer using the recovered clock from the FAD access device interface. The storage of the incoming cells in this manner allows for clock rate matching. The received cell is then forwarded to a four cell deep unicast or multicast buffer depending on information present in the cell header field. Cells from the unicast buffer are forwarded to one of eight port interface device buffers dedicated to each port interface device and stores unicast traffic for that port interface device. The destination port interface device information also is obtained from the appropriate cell header fields.

For cells using the multicast buffer, a lookup is done into a multicast vector table programmed by the central processing unit using eleven destination bits in the cell header. The multicast table lookup yields a set of port interface devices to which the cell is destined. Based on this information, the cells are forwarded to one or more interface device buffers dedicated to each port interface device interface which stores multicast traffic for the PID. Note that the Tap Mux on the switch card (CPU card), the multicast table should be programmed differently depending on whether it is primary or secondary CPU card.

The Tap Mux is the master on the eight independent port interface device transmit interfaces. Each interface is a sixteen-byte bus serving a single port interface device ASIC. The Tap Mux asserts a write signal to indicate the duration of a cell transfer. This interface also supports early cell termination so only as many words specified in the cell size output from the port interface device buffer will be transferred to the port interface device ASICs. In the case of back to back early cell termination cells, the Tap Mux will insure six clocks of delay between two consecutive asserts of the write signal. Finally, the Tap Mux verifies incoming cell parity in the transmit direction, and on air increments of cell parity air register (that is later read by the Tap Mux CPU). The cell is passed to the port interface device regardless of cell parity pass or fail.

The fabric access device (FAD) is a 596 pin PBGA ASIC, that resides on the switch fabric and interfaces the port and CPU modules to a central shared switching memory. Each FAD has a pair of high-speed differential serial inputs and a pair of high-speed differential serial outputs per Tap Mux, i.e., port module. The FAD accesses a shared memory using a 160-byte wide data bus. The FAD communicates via a high-speed serial channel, with the Tap Mux ASIC on the port/CPU modules. It also communicates with and is controlled by the SWIP processor ASIC on the switch fabric.

Data transfer between the FAD and the Tap Mux occurs through pairs of point-to-point low voltage differential pair signals. In the described embodiment, the data transfer rate is 1.6 GB/s and is encoded. In operation, the SWIP controller ASIC indicates to the FAD that valid data is available within the switch memory. Typically this indication is done through a defined port write and port select signal. Upon receiving the control signal, the FAD captures the data on the SRAM data bus and writes it to the appropriate transmit buffer which is indicated by the contents of the port select bus. More specifically, if the indication is that the message is a unicast message, then it is written to the unicast transmit buffer. If, on the other hand, the indication is that it is a multicast message, then it is written to the multicast transmit buffer. Each transmit buffer, for the unicast and the multicast messages can store up to four cells. Each cell, accordingly, can also store up to twenty bytes of data. In total, the FAD transmit section has eighteen transmit buffers; two buffers for every Tap Mux.

Continuing to refer to FIG. 4, it may be seen that the three groups of fabric access device buffers are communicatively coupled to nine Tap Muxes that in turn are also communicatively coupled to nine groups of OctaPIDs. Each of the nine groups of OctaPIDs, includes eight port interface devices (PIDs). The PIDs of each group of OctaPIDs, in turn, are coupled to communicate with a plurality of different Ethernet switches in the Ethernet switching plane. The Ethernet switching plane, in turn, is coupled to the specific networks or devices that are transmitting data into or receiving data from the switch fabric shown in FIG. 4.

Each port interface device processes the data from eight 10/100 Mb/s Ethernet connections and are thus named "OctaPIDs" to reflect that each OctaPID actually comprises eight port interface devices. Each OctaPID also is coupled, while not shown explicitly in FIG. 4, to SRAM and SDRAM as well as to a logic unit that controls addressing and routing for data received through the eight Ethernet port interface devices.

Nine different Tap Muxes are coupled to communicate with each of the three groups of registers of FADs 414, 416, and 418. More specifically, as described before, each of the nine Tap Muxes includes three sets of buffers. One is for storing data that is to be transmitted to the FAD and two are for storing data that is received from the FAD according to whether the data is to be unicast to a single destination or multicast to a plurality of destinations. Thus, while not all connections are shown in FIG. 4 for the sake of simplicity, some of the connections are shown to illustrate the manner in which the Tap Muxes are connected to the FAD register groups 414–418.

For example, the TX buffer of each of the nine Tap Muxes is coupled to one of the nine buffers of the RX buffer group 412 of the FAD. The parsing unit of each of the nine Tap Muxes is then coupled to two buffers, one of each of the unicast and multicast TX buffer groups 416 and 418, respectively of the FAD. For example, the parsing unit of Tap Mux 0 is connected to buffer 0 of the unicast buffer group 414 and buffer 0 of the multicast buffer group 416. The parsing unit of Tap Mux eight, similarly, is coupled to the eighth unicast TX buffer and to the eighth multicast TX buffer of the unicast and multicast buffer groups 416 and 418 respectively. As explained elsewhere, the parsing unit determines, when a signal is transmitted either from the unicast or multicast buffer groups, what kind of signal is being received and stores it within the appropriate unicast or multicast receive buffers.

Each of the nine Tap Muxes 426–438 is coupled to an OctaPID group 440–452, respectively. For example, Tap Mux 426 is coupled to OctaPID group 440 while Tap Mux 438 is coupled to OctaPID group 452. Each of the eight port interface devices of the OctaPID group, is capable of carrying 10 Mb/s of data.

Figure 5:
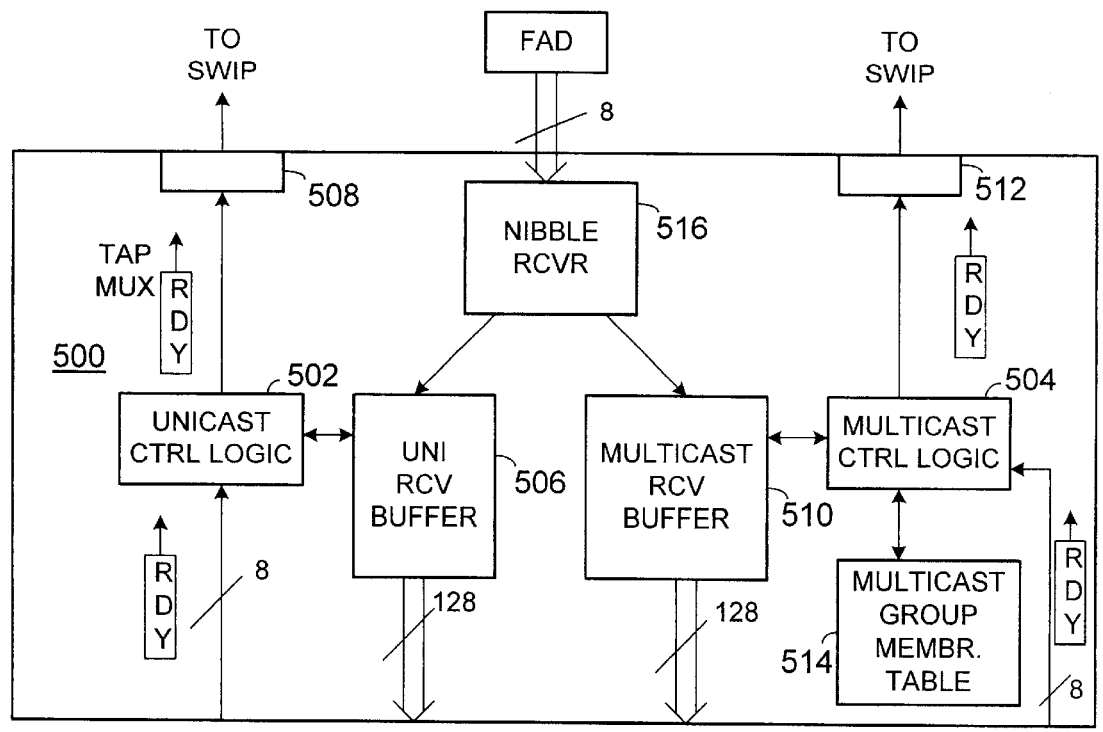
FIG. 5 is a functional block diagram of the receive circuitry of a Tap Mux according to one embodiment of the described invention.

FIG. 5 is a functional block diagram of the receive circuitry of a Tap Mux according to one embodiment of the described invention. Referring now to FIG. 5, a Tap Mux 500 includes a unicast control logic module 502 and a multicast control logic module 504 that are for determining when the Tap Mux 500 is receiving either unicast messages or multicast messages. Unicast control logic module 502 is coupled to receive ready signals from external port interface devices as well as being coupled to a unicast receive buffer 506 to determine when it is ready to receive data. Finally, unicast control logic module 502 is coupled to a port 508 for transmitting communication signals to an external SWIP controller. Control logic module 504 determines whether receive buffer 510 is ready to receive data according to whether buffer 510 has data that has not yet been transmitted over a high speed data bus.

Similarly, multicast control logic module 504 of Tap Mux 500 is coupled to receive a plurality of ready signals of a plurality of external port interface devices. Multicast control logic module 504 further is coupled to a multicast receive buffer 510 for determining when the multicast receive buffer 510 is ready to receive additional or new data. Multicast control logic module 504 further is coupled to a port 512 to transmit communication signals including a ready signal for indicating the Tap Mux is ready to receive more multicast data to an external SWIP controller.

Additionally, multicast control logic module 504 is coupled to communicate with a multicast group member table 514 to determine, based on a multicast address within a received cell, the group members to which the data contents of the cell are to be transmitted. Finally, Tap Mux 500 includes a nibble receiver 516 that is for receiving nibbles of data over a high-speed data bus from an external fabric access device. Nibble receiver 516 not only is for receiving nibbles of data to form bytes and cells of data, but also to determine whether the received cells are unicast cells or multicast cells. It then transmits the received cells to the corresponding receive buffers 506 or 510.

In operation, unicast control logic module 502 monitors the contents of unicast receive buffer 506 to determine whether it has data that needs to be transmitted to a port interface device or whether the buffer is either empty or data therein has already been transmitted. In one embodiment of the invention, the contents of the receive buffer 506 are cleared after the data is transmitted to a port interface device. In another embodiment, the data remains but a signal is used to specify whether the data has been transmitted thereby allowing the data to be written over with new data. Thus, once unicast control logic module 502 determines that the unicast receive buffer 506 is able to receive data, and it receives an indication that the port interface devices to which the Tap Mux is connected is ready and able to receive additional data, unicast control logic module 502 transmits a ready signal through a port 508 to a SWIP controller to indicate the same.

Similarly, multicast control logic module 504 monitors the contents of multicast receive buffer 510 to determine when it is ready to receive new data. Additionally, multicast control logic module 504 monitors the status of the port interface devices to which the Tap Mux is coupled to determine when and which port interface devices are ready to receive new data. Once the port interface devices are ready to receive data, and the multicast receive buffer 510 is ready to receive new data, multicast control logic module 504 generates a ready signal through port 512 to a SWIP controller to indicate the same. The SWIP then generates control commands to the FAD to prompt it to transmit nibbles of data to nibble receiver 516 of Tap Mux 500.

Figure 6:
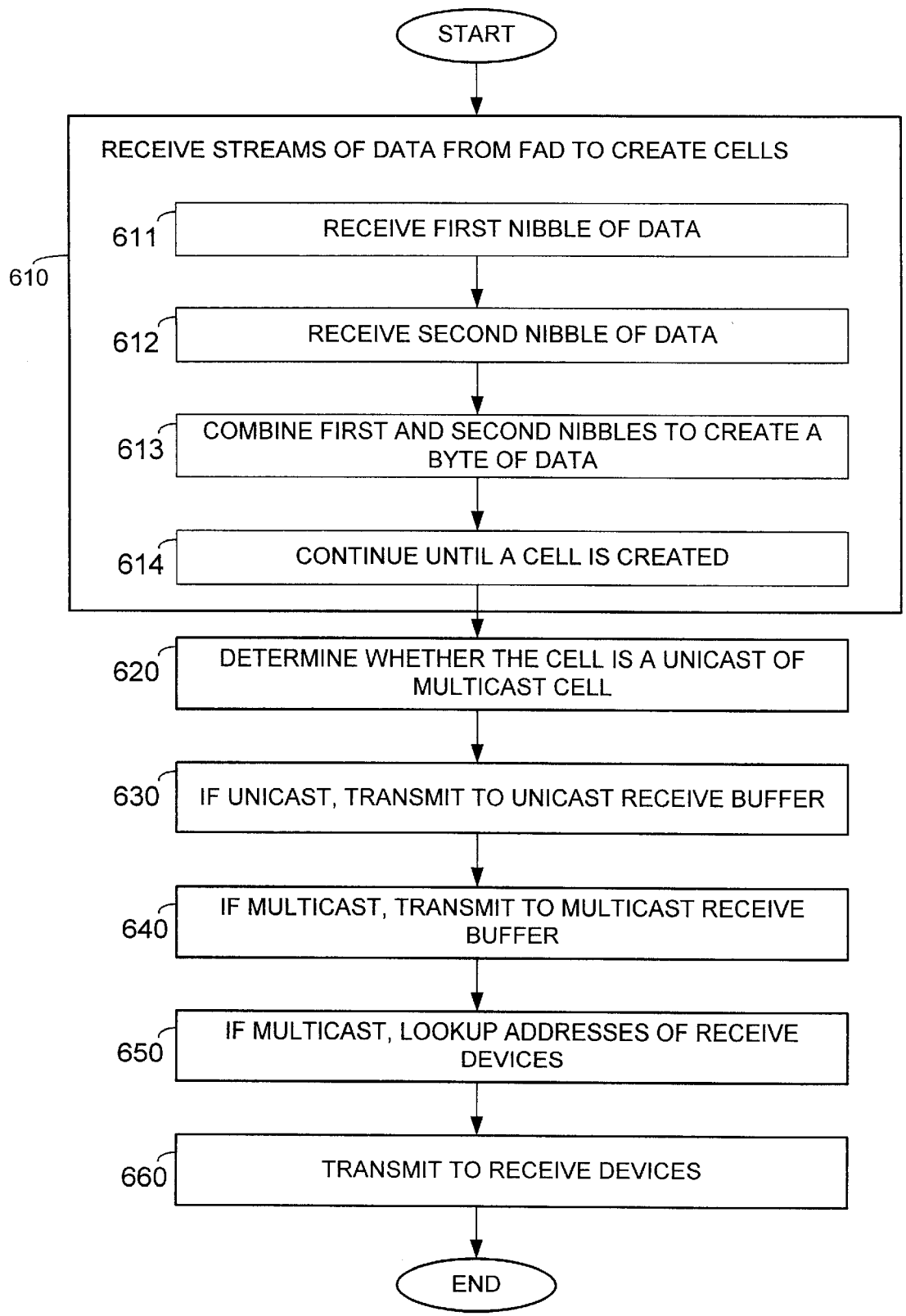
FIG. 6 is a flow chart illustrating a method performed within a multiplexing device for receiving data from a switch fabric device according to one embodiment of the present invention.

FIG. 6 is a flow chart illustrating a method performed within a multiplexing device for receiving data from a switch fabric device according to one embodiment of the present invention. Referring now to FIG. 6, the first step generally includes receiving streams of data from a fabric access device to create cells (step 610). This step includes receiving a first nibble of data (step 611), receiving a second nibble of data (step 612) and combining the first and second nibbles of data to create a byte of data (step 613). In the embodiment of the present invention, data is transmitted from a fabric access device (switch fabric) to the multiplex device in groups of 4 bytes. Two groups of 4 bytes are transmitted together and then combined to create a byte of data.

Thus, the invention includes continuing to receive nibbles and bytes of data until an 80-byte cell has been created (step 614). Once a cell has been created, the invention includes determining whether the received cell is a unicast or a multicast cell (step 620). In the described embodiment of the invention, the header that is received for the cell of data includes an address and at least one bit that defines whether the cell is a unicast or multicast cell.

If the cell is a unicast cell, the cell is transmitted to a unicast receive buffer (step 630). If the cell is a multicast cell, however, it is transmitted to a multicast receive buffer (step 640). If the cell is a multicast cell, then the invention also includes communicating with a memory, to examine the contents of a multicast group member table to determine the addresses of the receive devices, namely the devices there are to receive the multicast cell (step 650). Thereafter, whether the cell is a unicast or a multicast cell, it is transmitted to the corresponding receive device (s) (step 660).

Figure 7:
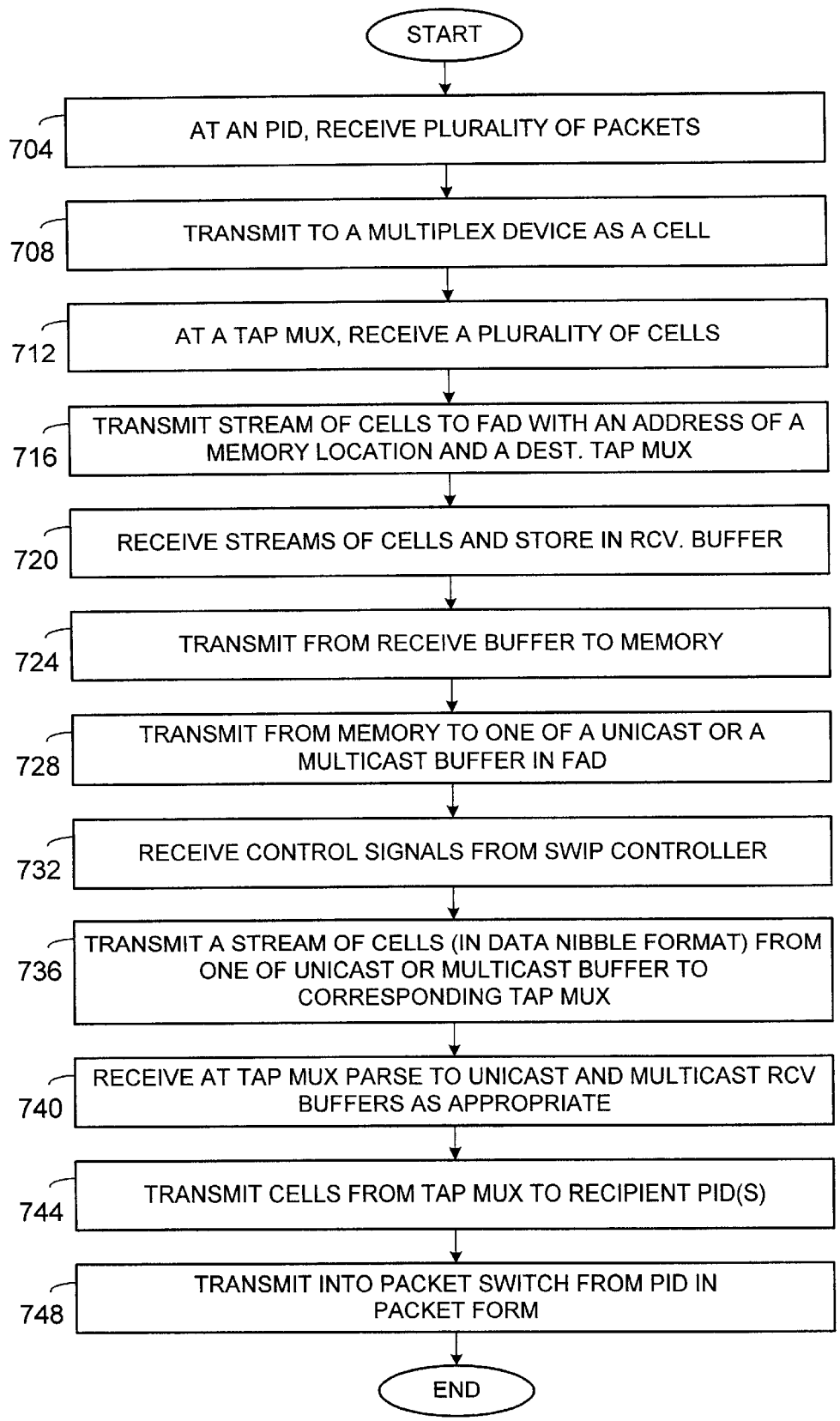
FIG. 7 is a flow chart illustrating a method within a switching fabric for routing packets from one external device to another according to one embodiment of the described invention.

FIG. 7 is a flow chart illustrating a method within a switching fabric for routing packets from one external device to another according to one embodiment of the described invention. Initially, a plurality of packets are received by a port interface device (step 704). After receiving the plurality of packets the port interface device, for example, an OctaPID as illustrated in FIG. 4, transmits the plurality of packets as a cell to a Tap Mux (step 708). At the Tap Mux, the cell that was transmitted by the port interface device, as well as other cells, are received (step 712).

Thereafter, the Tap Mux transmits a stream of cells to a fabric access device with an address of a memory location and a destination Tap Mux (step 716). The fabric access device, then receives the stream of cells and stores them in a receive buffer (step 720). The fabric access device then transmits the streams of cells from the receive buffer to memory (step 724). In the described embodiment of the invention, the memory is formed of SRAM memory. Thereafter, the data is transmitted from memory to one of a unicast or a multicast buffer within the fabric access device (step 728). The fabric access device then receives control signals from a SWIP controller to enable the fabric access device to select the buffer whose contents are to be transmitted next to a Tap Mux (step 732). The fabric access device transmits a stream of cells (in data nibble format) from one of a unicast or multicast buffer to a corresponding Tap Mux (step 736) according to the received control signals from the SWIP controller. At the Tap Mux, the stream of cells are received and are parsed to the unicast and multicast receive buffers as appropriate (step 740). Thereafter, the Tap Mux transmits cells from the Tap Mux to the recipient PIDs (step 744). The PIDS then transmit the cells in packet form into a packet switch for distribution to a destination device (step 748).

Figure 8:
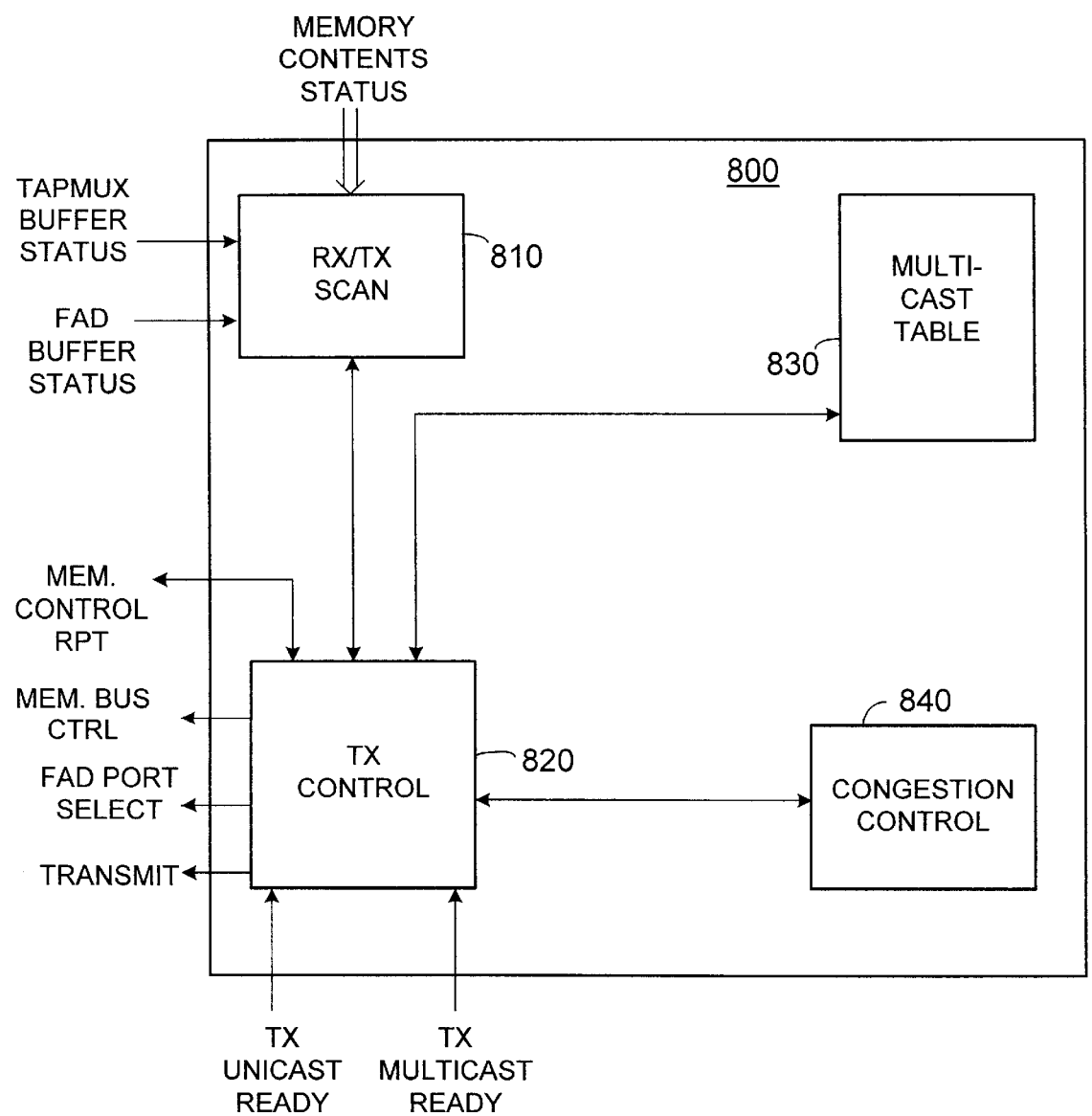
FIG. 8 is a functional block diagram of a SWIP controller according to one embodiment of the described invention.

FIG. 8 is a functional block diagram of a SWIP controller according to one embodiment of the described invention. Referring now to FIG. 8, a SWIP controller 800 comprises a plurality of modules for scanning memory and buffer content status, for communicating with a multicast table for controlling transmissions, and for controlling transmissions in light of detected congestion conditions. More specifically, a RX/TX scan module 810 is coupled to receive status information from the memory. In the described embodiment, the status information is received from the SRAM memory. It is also coupled to receive buffer status information for the Tap Mux buffers and for the FAD buffers. RX/TX scan module 810 communicates with the TX control module 820 and provides information to the TX control module 820 to enable it to determine which FAD buffers should have their contents transmitted over the high speed data bus to the Tap Muxes.

In the described embodiment of the invention, the RX/TX scan module 810 provides a list of FAD buffers that have data for transmission. For example, RX/TX scan module 810 might inform TX control module 820 which unicast and which multicast TX buffers have data ready for transmission. TX control module 820 also is coupled to receive ready indications from the Tap Muxes to indicate whether the Tap Mux is ready to receive unicast transmissions and whether it is ready to receive multicast transmissions on a per Tap Mux basis.

Because there are nine different Tap Muxes, the TX control module 820 actually receives a total of eighteen TX unicast ready and TX multicast ready signals, collectively. TX control module therefore analyzes the TX unicast ready and TX multicast ready signals in relation to the types of data that are ready to be transmitted, as indicated by RX/TX scan module 810 and then selects a FAD port that is to transmit and at the right time issues a transmit signal to cause it to transmit the contents of its corresponding buffers onto the high speed data bus to the Tap Mux.

SWIP controller 800 further includes a multicast table 830 that provides multicast address locations to TX control module 820 to enable it to determine whether it can generate a multicast message. Finally, TX control module 820 communicates with congestion control module 840 to determine transmission priorities based on detected congestion conditions within the network.

In operation, RX/TX scan module 810 receives information regarding the contents of the SRAM memory buffer, in the described embodiment as well as the buffer status of the Tap Mux buffers and the FAD buffers. For the Tap Mux, RX/TX scan module 810 receives twenty-seven Tap Mux buffer status signals, since there are up to nine Tap Muxes in a system and each Tap Mux includes three buffers, one for transmission and two for receiving. Similarly, RX/TX scan module 810 receives twenty-seven FAD buffer status signals since there are three sets or groups of buffers within a FAD each having nine buffers internally, one for each Tap Mux.

The TX control module 820, communicates with RX/TX scan module 810 to determine which of those buffers are ready to receive data and which of those buffers have data that is to be transmitted. Additionally, the TX control module 820 receives the memory content status either directly or, in the described embodiment from the RX/TX scan module 810, to determine when data within a FAD RX buffer should be written to memory (e.g., the SRAM memory of the switching fabric) so that it can be temporarily stored as a part of the switching operations.

As will be explained in greater detail elsewhere, the TX control module 820 further communicates with congestion control module 840 to determine the appropriate response for detected levels of congestion within the system. For example, TX control module 820 will examine the contents of memory that are dedicated for a given external device that is to receive data. The TX control module 820 then generates a memory congestion report to each of the external devices that has data that it wants to transmit through the switch fabric to another device. Specific congestion responses will be described in greater detail below.

FIG. 9 is a flow chart illustrating a method within a controller for monitoring congestion according to one embodiment of the described invention. Initially, a SWIP controller monitors the memory status for the memory that is used to temporarily store data that is being switched for all of the port interface devices (step 910). In the described embodiment, the invention includes monitoring SRAM memory status for all 72 PIDS. For example, in the described embodiment, each PID is assigned its own area of memory within the SRAM memory. Accordingly, the SWIP controller may monitor each of the assigned areas of memory to determine if congestion is likely to occur or is occurring for data being transmitted to one or more PIDS. Thus, the process of determining whether congestion exists or is about to exist includes, for each PID, determining the number of registers or memory buffers being used for data (step 920). Since the described embodiment can include up to seventy-two PIDs, this step includes determining memory status for all seventy-two PIDs. Thereafter, the SWIP controller assigns a congestion rating based on specified parameters (step 930). Finally, in the described embodiment, the SWIP controller transmits the congestion rating to all of the port interface devices (step 940). That way, each PID that has data to be transmitted to another PID may examine, among other factors, the congestion rating for the recipient OctaPID to determine whether to transmit or discard data thereto. In the described embodiment of the invention, status is sent to seventy-two PIDs.

FIG. 10 is a table that illustrates an exemplary assignment of congestion rating with respect to the amount of memory consumed. By way of example, the column shown generally at 1010 illustrates that, in the described embodiment, one of four different congestion ratings may be assigned to an OctaPID. The column shown generally at 1020 then illustrates the number of memory registers or buffers that must be in use for a given rating. Thus, a level 1 congestion rating means that 0–15 buffers or registers are being used. A level 2 rating indicates that 16–31 buffers or register are in use, while a level 3 rating indicates that 32–47 buffers or registers are in use, and finally a level 4 rating indicates that the allocated memory for a given OctaPID has 48–64 registers or buffers being used to hold data. If, for example, each OctaPID is assigned 64 buffer sets or registers for holding data, then the level 4 congestion rating indicates that congestion is imminent or is occurring. It is understood that these ranges may be modified by different values.

FIG. 11 is a table that illustrates the contents of memory in which there exists a mapping between the 72 PIDS of the system and their respective congestion ratings. Thus, as may be seen, column 1110 list all 72 PIDS while column 1120 lists an exemplary congestion rating for each PID.

FIG. 12 is a flow chart illustrating a method, performed by a port interface device, for determining whether to transmit a data packet to another port interface device through a switch fabric. Referring now to FIG. 12, a port interface device receives a congestion rating for all port interface devices within the system (step 1210). By way of example, in one described embodiment of the invention, 72 PIDS are coupled within one system. Accordingly, each of the 72 OctaPIDS receive the congestion rating for itself as well as for the other 71 PIDS. In addition to periodically receiving congestion ratings for all the PIDS, each of the OctaPIDS will receive data packets for one or more other PIDS (step 1220). For each data packet that is received, the invention includes examining a QoS rating for the data packet (step 1230). Thereafter, the OctaPID transmits packets through the switch fabric based on the combination of the recipient port interface device congestion rating and the QoS of the data packet that is to be delivered thereto (step 1240).

FIG. 13 is a table illustrating an example of a method for transmitting packets based on congestion rating according to one example of the described invention. As may be seen, a given PID has received four packets of data for each of the PIDS A, B, C, and D as shown generally at column 1310. For each of the four OctaPIDS that are to receive the data packets, the PID receiving the data packets for transmission examines the congestion rating for each of the recipient PIDS. Thus, from examining the column generally at 1320, it may be seen that OctaPIDS A and B have a congestion rating of 1, while PID C has a congestion rating of 2, and PID D has a congestion rating of 4.

FIG. 14 is a table illustrating the assignment of quality of service ratings according to the type of data being transmitted which, may also relate to the source of the data. For example, in the column shown generally at 1410, two types of data are illustrated. The column generally shown at 1420 illustrates the QoS rating for each of the two types of data. Thus, the variable bit rate data (VBR) has a quality of service rating equal to 2 while the continuous bit rate data (CBR) has a QoS rating of 1. Referring again to the method of FIG. 12, the final step of step 1240 included transmitting packets based on the QoS and the congestion rating is illustrated in FIGS. 13 and 14.

Figure 15:
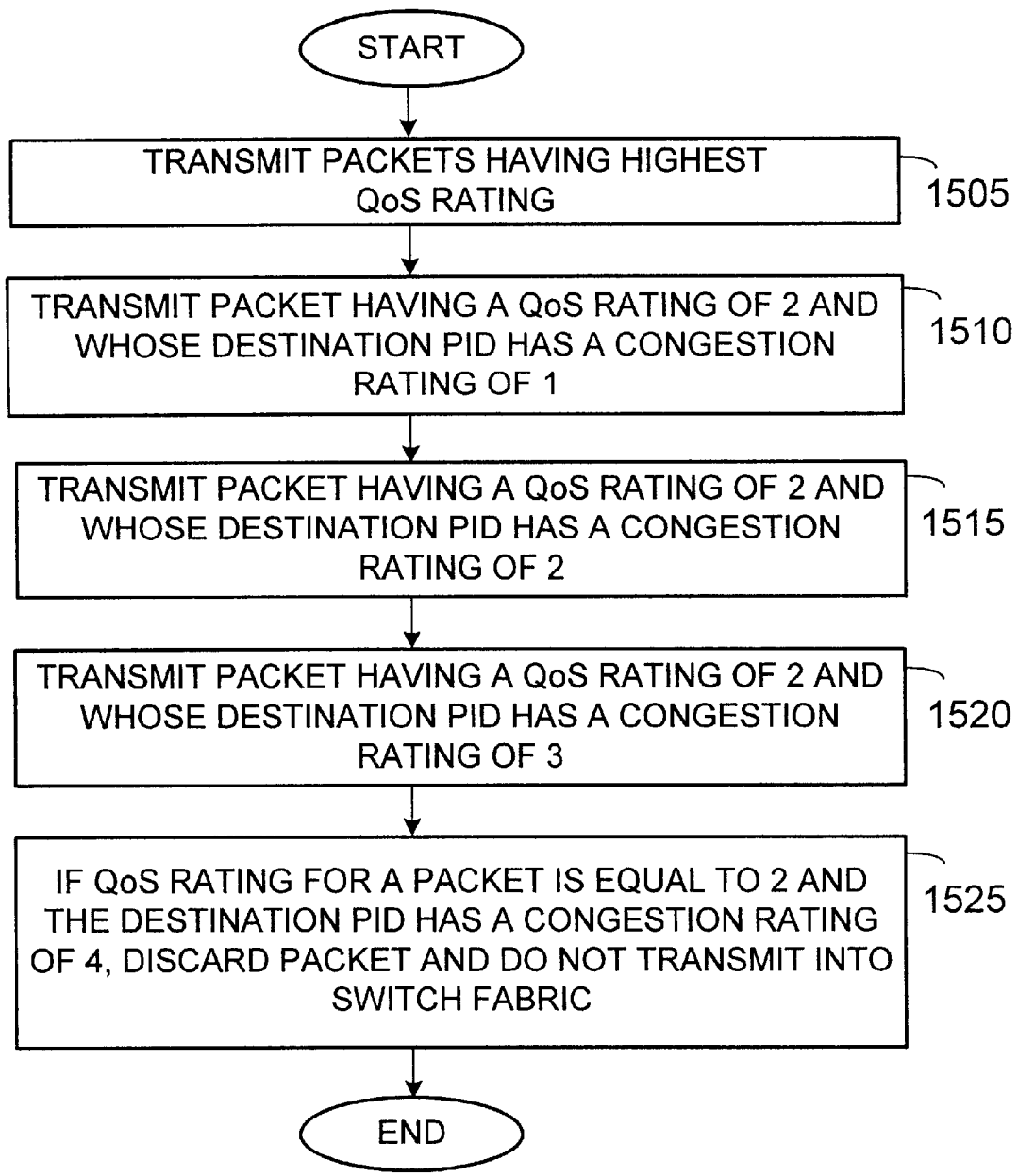
FIG. 15 illustrates one example of how the quality of service and congestion ratings may be accounted for in determining whether to transmit a data packet or a cell to a Tap Mux from a port interface device.

FIG. 15 illustrates one example of how the quality of service and congestion ratings may be accounted for in determining whether to transmit a data packet or a cell to a Tap Mux from a port interface device. In the exemplary method of FIG. 15, the port interface device will transmit any data packets having a QoS rating that is the highest in the QoS rating system being used (step 1505). In the described example, the highest QoS rating is a "1". Thereafter, it will transmit all data packets having a QoS rating of 2 (not highest rating) for all packets whose destination port interface device has a congestion rating of 1 (step 1510). Thereafter, the port interface device will transmit all data packets whose QoS rating is equal to 2 and whose destination port interface has a congestion rating of 2 (step 1515). Finally, the port interface device will transmit those data packets having a QoS rating of 2 for all packets whose destination port device has congestion rating of 3. Finally, if the QoS rating for a given packet is a rating of 2 and the destination port interface device has a congestion rating of 4, then the packet is discarded and is not transmitted into the switch fabric (step 1525). In general, all data packets having a highest rating are transmitted first. After that, packets are transmitted in order of increasing congestion for the recipient PID.

Figure 16:
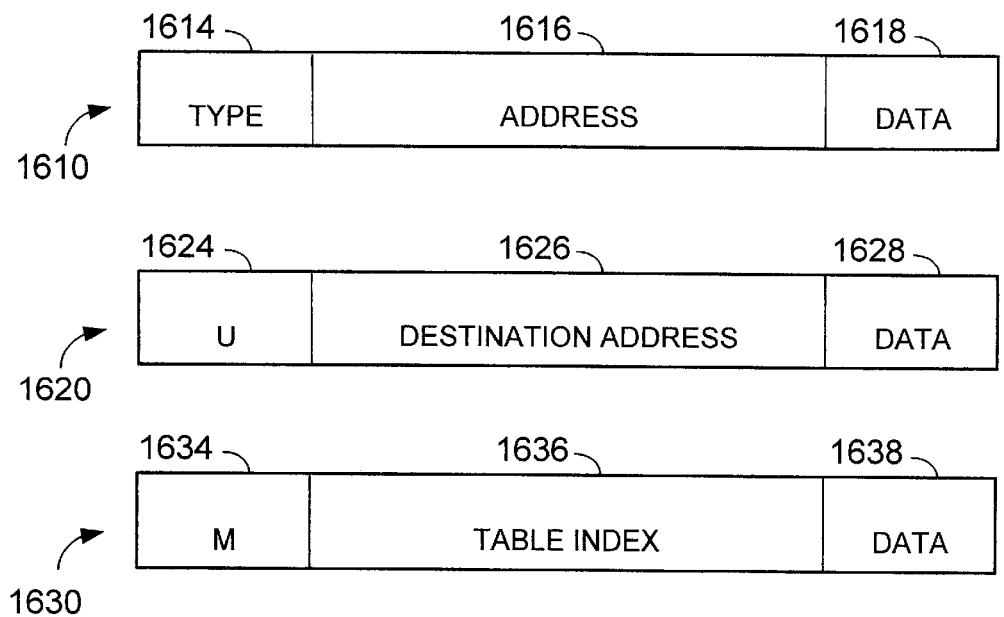
FIG. 16 is a functional block diagram illustrating a plurality of signals that are transmitted according to an embodiment of the present invention.

FIG. 16 is a functional block diagram illustrating a plurality of signals that are transmitted according to an embodiment of the present invention. Referring now to FIG. 16, a signal, and more particularly, a cell found generally at 1610 includes three portions. The first portion is for storing a logical value that defines the type of cell being transmitted. More specifically, in first portion 1614, the signal type may be defined. In the described embodiment, portion 1614 is 1 byte long wherein a logical 1 represents a first signal type and a logical 0 represents a second signal type. For example, while the exemplary first signal type represents a unicast message, while the second signal type represents a multicast message. The second portion 1616 is, generally, for storing a destination address. Finally, a third portion 1618 is for storing the actual bytes of data that are being carried by the cell. Typically, portions 1 and 2, in combination, are no longer than 4 bytes. The third portion, namely the data portion 1618 is, in the described embodiment of the invention, 76 bytes long.

Continuing to examine FIG. 16, signals 1620 and 1630 illustrate alternative embodiments of a cell formed and transmitted according to the present invention. First, examining cell 1620, first portion 1624 stores an indication that the cell is a unicast cell meaning that it is to be delivered to only one destination. The second portion of signal 1620 is the destination address portion 1626 that stores the unique address of the device to which the cell is to be transmitted. Finally, the data portion 1628 includes the cell data that is to be delivered to the destination device.

The cell 1630 includes a first portion 1634 that defines the cell as being a multicast cell. The second portion 1636, instead of including a destination address, includes a table index value. The third portion is the data portion 1638 for carrying the data to the plurality of devices to which cell 1630 is to be delivered. The table index portion 1636, as described before, is extracted by a receiving multiplex device and is used to index a table within a memory to determine the unique combination and addresses of the destination devices that are to receive signal or cell 1630.

Figure 17:
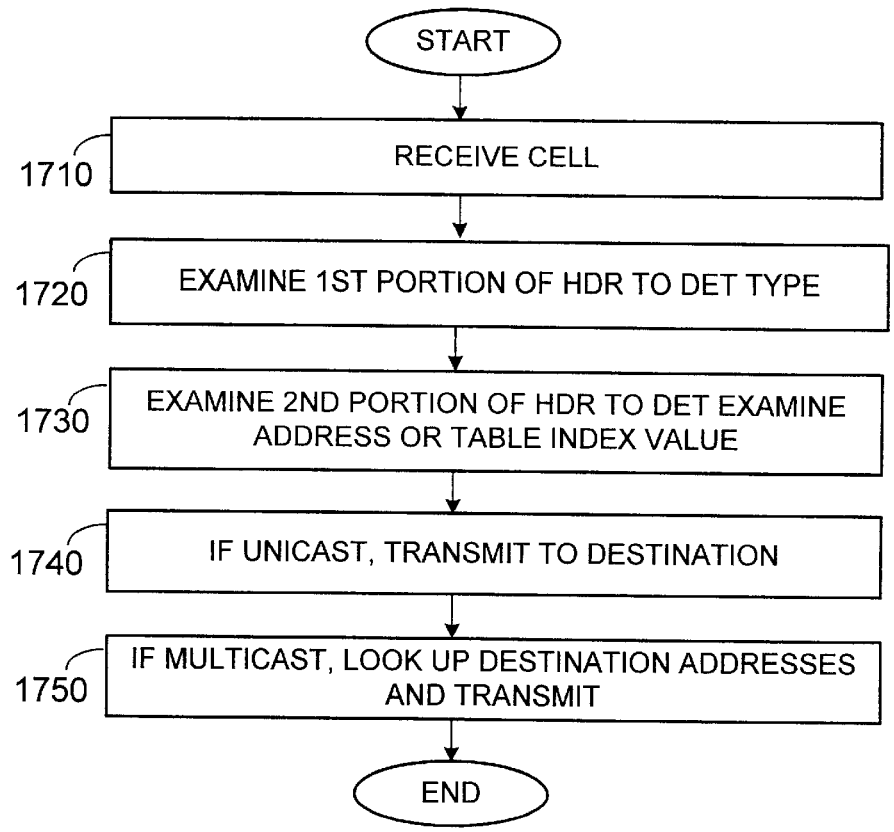
FIG. 17 is a flow chart illustrating a method for receiving and transmitting a cell according to one embodiment of the described invention.

FIG. 17 is a flow chart illustrating a method for receiving and transmitting a cell according to one embodiment of the described invention. Initially, a multiplex device receives a cell (step 1710). Thereafter, the multiplex device examines a first portion of a header of the cell to determine the type (step 1720). As described before, the cell type can be one of two types. It may be either a unicast cell meaning that it is to be transmitted to only one device or it may be a multicast cell meaning that it is to be transmitted to a plurality of devices. If the cell is a unicast cell, the invention includes transmitting it to the specified destination or device (step 1740). If the cell is a multicast cell, the invention includes looking up the destination addresses in a memory according to the table index value received in the second portion of the cell, namely the address portion of the cell, and transmitting the cell to the corresponding device (step 1750).

As used in this description, the functionality performed by ASIC components may alternatively be implemented using any alternative logic controller, such as a programmable gate array (PGA), a field programmable gate array (FPGA), a microprocessor, or any alternative logic circuitry to perform the described function. As also used in this description, storage media may include different forms of memory including semiconductor memory devices such as dynamic or static random access memories (DRAMS or SRAMS), erasable and programmable read-only memories (EPROMS), electrically erasable and programmable read-only memories (EEPROMS) and flash memories; magnetic discs such as fixed, floppy and removable disks; other magnetic media including tape; and optical media such as compact discs (CDs) or digital versatile discs (DVDs). Instructions that may make up the various software routines to control the logic controllers in this system may be stored in respective storage devices. The instructions when executed by a respective control unit cause the corresponding system to perform programmed acts. The inventive method and apparatus disclosed herein are particularly advantageous in that they support the efficient transmission of multicast cells over a high speed data bus in a manner in which all multicast messages are transmitted only one time. The receiving system, by being made to process multicast messages in a specified manner, can determine the destination devices and their addresses and can send the one received multicast message to each of the intended recipients.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. For example, the circuitry described herein may be formed of electrical or optical components or a combination thereof. Additionally, the concepts herein apply equally to packets or cells and references herein to either one should be viewed as a reference to the other as well. Moreover, while the exemplary embodiments are for a system that operates with fixed length packets or cells, the invention may also be used for variable packet length systems. As may be seen, the described embodiments may be modified in many different ways without departing from the scope or teachings of the invention.

What is claimed is:

1. A switching fabric controller for controlling data packet routing from an input source to a destination, comprising:
   a scanning module coupled to receive stat information from a memory, a multiplex device and a fabric access device;
   a logic control module coupled to generate control commands to select a fabric access device port and to a memory for controlling input and output from the memory;
   a congestion control module for determining congestion conditions and for determining transmission logic with respect to the determined congestion conditions;
   a plurality of demultiplexers that are connected in between three fabric access device buffer groups and a memory wherein the logic control module produces control commands to the demultiplexers according to the determined congestion conditions as a part of routing data packet traffic; and
   wherein the logic control module includes control commands to select data for transmission from one of a unicast transmission buffer or a multicast transmission buffer according to the determined congestion conditions.

2. The controller of claim 1 wherein the controller also is coupled to receive unicast transmit ready and multicast transmit ready signals from the fabric access device.

3. The controller of claim 1 wherein the scanning module is formed to receive memory content status information and to determine an amount of memory usage for an area of memory that is assigned to an external device.

4. The controller of claim 1 wherein the controller is an ASIC device.

5. The controller of claim 1 wherein controller is a programmable gate array.

6. The controller of claim 1 wherein the controller includes a processor, a memory and an internal bus over which the processor and memory communicate, further wherein the memory includes computer instructions that define operational logic for the controller.

7. The controller of claim 6 wherein the computer instructions define logic that create scanning, logic control and congestion modules.

8. A switching fabric controller coupled to produce control signals to each of three demultiplexers that are connected in between three fabric access device buffer groups and a memory, the controller for controlling data packet routing from an input source to a destination, comprising:
   control circuitry coupled to produce control commands to each of the three demultiplexers; and
   logic circuitry coupled to communicate with the control circuitry, the logic circuitry including logic to detect congestion within the switching fabric wherein the logic prompts the control circuitry to produce control commands to the demultiplexers according to the detected congestion.

9. The controller of claim 8 wherein the logic circuitry generates a signal that identifies congestion levels for each external device that is connected to receive data routed through the switch fabric.

10. The controller of claim 9 wherein the demultiplexers are each coupled to nine groups buffers and wherein the controller includes logic to send control commands to the first demultiplexer to select one of the nine buffers for uploading or downloading data between it and the memory.

11. The system of claim 10 wherein switch controller is coupled to produce control commands to a third of the three demultiplexers to select one of the nine buffers for uploading or downloading data between it and the memory.

12. The controller of claim 9 wherein the control circuitry includes logic that causes unicast data to be temporarily stored in a second of the three fabric access device buffer groups that is for storing unicast data.

13. The controller of claim 12 wherein the demultiplexers are each coupled to nine groups buffers and wherein the controller includes logic to send control commands to the second demultiplexer to select one of the nine buffers for uploading or downloading data between it and the memory.

14. The controller of claim 9 wherein the control circuitry includes logic that causes received data to be temporarily stored in a third of the three fabric access device buffer groups.

15. A method for controlling communications within a switch fabric, comprising:
   receiving memory status for a switch fabric memory;
   determining the amount of memory being used by each external device that is to receive stored data;

selecting one of at least three demultiplexers according to detected congestion and producing control commands to control traffic through at least one of the at least three demultiplexers;

assigning a congestion rating for each device that is to receive data; and transmitting the congestion rating to all external devices coupled to transmit and receive data through the switch fabric.

16. The method of claim 15 wherein the memory is divided to separately store data for each external device coupled to transmit and receive data through the switch fabric.

17. The method of claim 16 wherein the step of receiving memory status includes receiving memory status for each of the external devices coupled to transmit and receive data through the switch fabric.

18. The method of claim 17 wherein the assigned congestion rating for each device that is coupled to transmit and receive data through the switch fabric is transmitted to all of the external devices coupled to transmit and receive data through the switch fabric.

19. The method of claim 15 wherein one of four different congestion ratings are assigned to each of the devices that are coupled to transmit and receive data through the switch fabric.

20. The method of claim 19 wherein one of the four congestion ratings is assigned according to the number of memory registers being used to store data that is to transmitted to a corresponding external device.

* * * * *